United States Patent

Kitazume et al.

[11] Patent Number: 5,023,788
[45] Date of Patent: Jun. 11, 1991

[54] CONTROL APPARATUS OF WORKING ROBOT TO FLATTEN AND FINISH THE CONCRETED FLOOR

[75] Inventors: Masahiro Kitazume; Kazuya Honma, both of Yokohama, Japan

[73] Assignee: Tokyo Keiki Company Ltd., Tokyo, Japan

[21] Appl. No.: 502,285

[22] Filed: Mar. 30, 1990

[30] Foreign Application Priority Data

Apr. 25, 1989 [JP] Japan .................... 64-105469

[51] Int. Cl.$^5$ .................................................. G05D 1/02
[52] U.S. Cl. ........................ 364/424.01; 180/7.1; 318/568.12
[58] Field of Search ........... 364/513, 474.06, 424.01; 180/7.1; 318/568.12

[56] References Cited

U.S. PATENT DOCUMENTS

| | | | |
|---|---|---|---|
| 4,600,999 | 7/1986 | Ito et al. | 364/513 |
| 4,674,048 | 6/1987 | Okumura | 318/568.12 |
| 4,706,004 | 11/1987 | Komatsu et al. | 364/513 |

FOREIGN PATENT DOCUMENTS 62-293320 12/1987 Japan .

Primary Examiner—Allen R. MacDonald
Assistant Examiner—George Davis
Attorney, Agent, or Firm—Wenderoth, Lind & Ponack

[57] ABSTRACT

A rotary trowel is provided for a working robot which can freely run and the concreted floor is flattened and finished by the rotary trowel while the robot runs on the concreted floor. The working robot is automatically operated in accordance with a zigzag running pattern which was set in a desired working range which is determined by a width and a depth. When the teaching mode is set, the first straight running and the first turning operation of a zigzag running pattern which will be set are executed by the manual operation. Thus, a straight running distance and turning direction which were detected by the manual operation are set as initial values and the zigzag running pattern is automatically set. Subsequently, the automatic operation is performed in accordance with the zigzag running pattern which was automatically set.

7 Claims, 9 Drawing Sheets

CONTROL APPARATUS OF WORKING ROBOT TO FLATTEN AND FINISH THE CONCRETED FLOOR

BACKGROUND OF THE INVENTION

The present invention relates to a control apparatus of a working robot to flatten and finish the concreted floor by a rotary trowel and, more particularly, to a control apparatus of a working robot which is automatically operated and controlled in accordance with a preset running pattern.

In recent years, the working robot which is used to flatten and finish the concreted floor at a construction field has been tried to be put into practical use.

In such a working robot, a rotary trowel which is called a trowel is provided in the rear portion of the robot main body which can run by right and left running wheels and the working robot runs on the concreted floor and flattens and finishes it while rotating the rotary trowel.

The manual operation and automatic operation can be selected as a running operation of the robot. With respect to the automatic operation, for instance, as shown in FIG. 1, a working range 12 is set in a segment 10 which is partitioned by walls or the like and is concreted by designating a lateral width $L_x$ and a depth $L_y$. A zigzag running pattern 14 is set into the working range 12. The robot is automatically operated along the running pattern 14.

In the setting of the running pattern 14, the robot is positioned to a running start point 100 and is correctly directed to the running direction. In this state, the azimuth detected by a gyrocompass or the like is set as a reference azimuth. On the other hand, the first turning direction is set to, for instance, the left direction. Further, a lap width W as a running distance in the depth direction is set. In this way, the shown zigzag running pattern can be set in the working range 14.

By setting the distance within the working width of the rotary trowel attached to the robot as a lap width W, the occurrence of an unworking region is prevented.

However, in such a conventional control apparatus of the robot to finish the concreted floor, in the case of working a plurality of segments having working ranges of different shapes, the width and depth of the working range and the turning direction variably change in accordance with the order of the concreting processes for the working ranges. Therefore, it is necessary to change the running pattern by resetting the width and depth and the first turning direction each time they change. Generally, with respect to the value of depth, the stop and restart of the automatic operation are repeated while observing the hardening state of the concrete. Therefore, in many cases, the value of depth is set to a relatively large value and the operator manages the depth. Particularly, since it is required to frequently set and change the width and turning direction, there is a problem such that the setting operations become complicated.

As shown in FIG. 1, on the other hand, in the case where the lateral width changes in the way of the depth by an obstacle 16 such as a pillar or the like, for instance, the automatic operation is stopped at a point 300 and a now working range 12-1 is set and, thereafter, the automatic operation is restarted. Further, the automatic operation is again stopped at a point 400 as a running end position of the working range 12-1 and the working range must be set and changed to the original working range 12. Therefore, in the case where the working range does not have a rectangular shape because a projection such as a pillar or the like exists in the working range, there is a problem such that the measuring works to determine the working range become complicated and it is necessary to frequently set and change the working range.

SUMMARY OF THE INVENTION

It is an object of the present invention to provide a control apparatus of a working robot to finish a concreted floor in which a zigzag running pattern can be simply easily set.

Another object of the invention is to provide a control apparatus of a working robot to finish a concreted floor in which a zigzag running pattern for automatic operation can be automatically formed on the basis of the result of the learning by the manual operation.

Still another object of the invention is to provide a control apparatus of a working robot in which a zigzag running pattern for automatic operation is formed by the manual operation in which a teaching mode is set.

Further another object of the invention is to provide a control apparatus of a working robot to finish a concreted floor in which a zigzag running pattern for automatic operation is formed by the learning running from the running start point to the first turning point.

That is, according to a working robot of the invention, a rotary trowel to flatten and finish the concreted floor is attached to the robot main body which can freely run by right and left driving wheels. The working robot is automatically operated in accordance with a zigzag running pattern set in a desired working range which is determined by a width and a depth.

With respect to such a working robot, according to a control apparatus of the invention, the teaching mode is set, and when the working robot is learned and run by the manual operation from the running start point of a desired zigzag running pattern to the first turning point, the zigzag running pattern can be automatically formed on the basis of the result of the learning.

That is, the robot is positioned to the running start point in the working range, the progressing direction is set into the straight direction of the running pattern, the teaching mode is set in this state, and the manual operation is started. When the straight running from the running start point to the first turning point and the turning operation subsequent to the straight running at the turning point are executed by the manual operation in the teaching mode, a zigzag running pattern in which the straight running distance and the right or left turning direction at this time point are set as initial values is automatically formed. Therefore, the operating mode can be shifted to the automatic operation from the time point of the end of the first turning operation.

Therefore, even if the width of working range or the running start point changed by the order of the concreting processes or the like, by merely executing the first straight running and turning operation by the manual operation in the teaching mode, the operating mode can be set into the automatic operation according to the running pattern. The setting operation to determine the running pattern can be made unnecessary.

On the other hand, with respect to the working range in which the lateral width and depth change in the way of working, the automatic operation is stopped at the position where the lateral width or depth changed and the manual operation by the setting of the teaching mode is similarly performed. Thus, for a change in working width, the automatic operation can be executed by easily changing the running pattern.

The above and other objects, features, and advantages of the invention will become more apparent from the following detailed description in conjunction with the accompanying drawings.

DETAILED DESCRIPTION OF THE DRAWINGS

DETAILED DESCRIPTION OF THE PREFERRED EMBODIMENT

Figure 2:
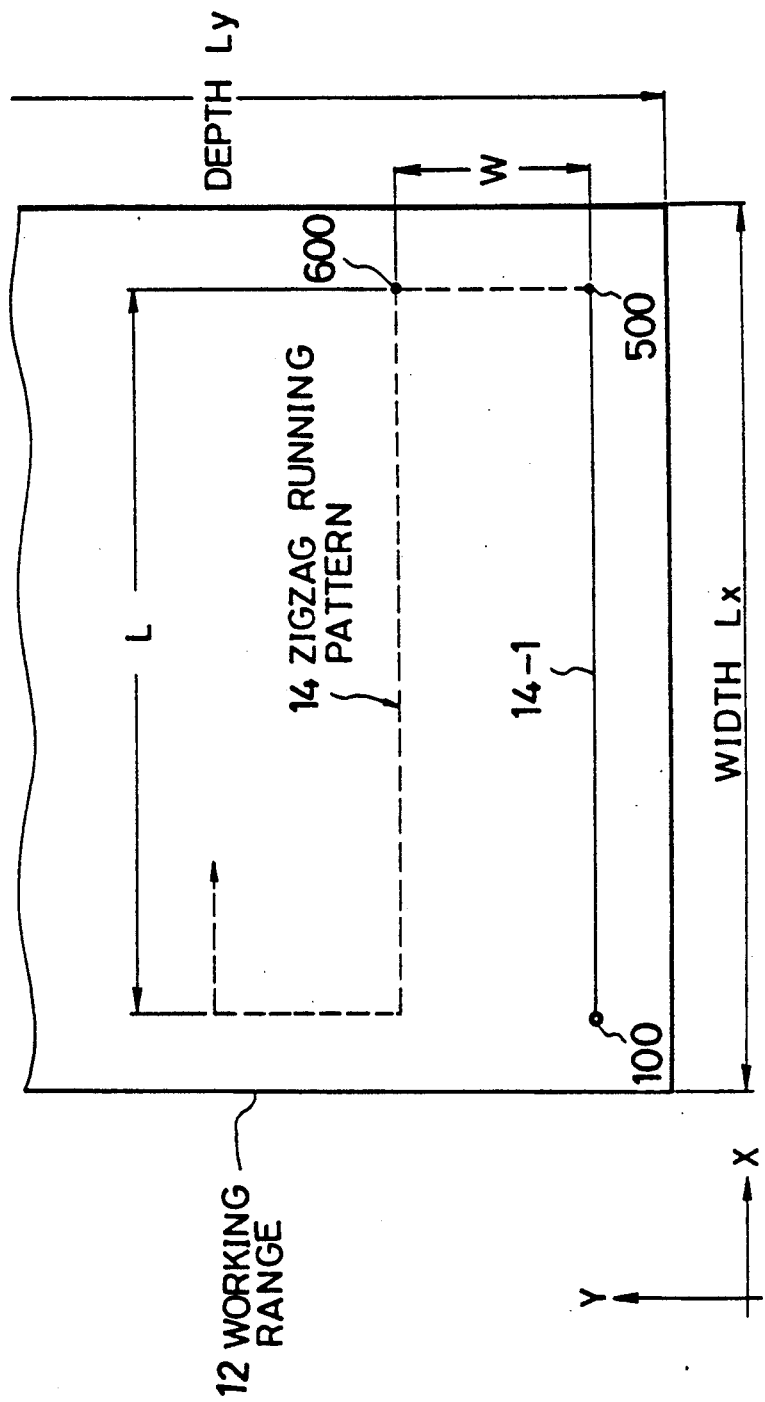
FIG. 2 is an explanatory diagram for explaining the principle of the automatic setting of a zigzag running pattern according to the invention.

FIG. 2 is an explanatory diagram of the principle of the robot operation control according to the present invention.

Figure 3:
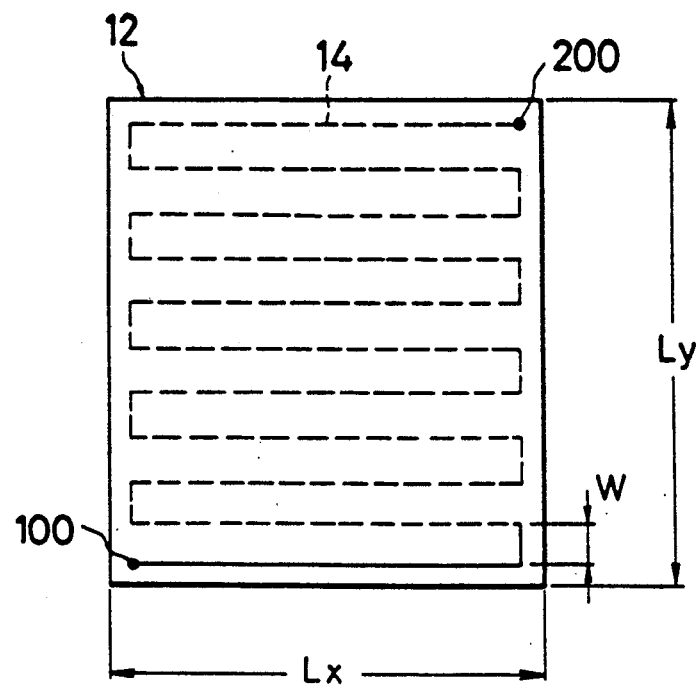
FIG. 3 is an explanatory diagram of a zigzag running pattern according to the invention in the case where the first turning direction is set to the left turn.
Figure 4:
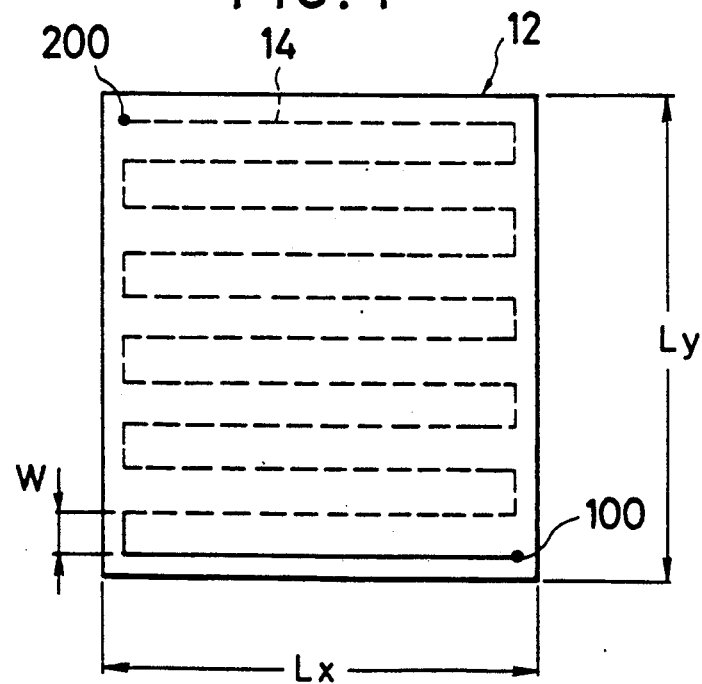
FIG. 4 is an explanatory diagram of a zigzag running pattern of the invention in the case where the first turning direction is set to the right turn.

In FIG. 2, the working range 12 is set in the segment which is partitioned by walls or the like. As shown in FIGS. 3 and 4, the working range 12 can be set by deciding the width $L_x$ and depth $L_y$.

The zigzag running pattern 14 is set into the working range 12.

First, the setting of a zigzag running pattern based on the setting operation of initial values without executing the manual operation by the teaching mode will be explained.

First, a robot is moved and positioned to the running start point 100 in the working range 12. The progressing direction of the robot is set into the direction of a first straight running pattern 14-1. In a state in which the robot was positioned to the running start point 100, the detection azimuth showing the progressing direction detected by azimuth directing means such as a gyrocompass or the like installed in the robot is set as a reference azimuth. On the other hand, the turning direction at a first turning point 500, in this case, the left direction is set. Further, the lap width W in the depth direction is set. After completion of the above setting operation, the zigzag running pattern 14 starting from the running start point 100 in the working range 12 and arriving at a running end point 200 can be set.

When the automatic operation of the robot is started from the running start point 100, the automatic operation according to the set zigzag running pattern 14 is executed. That is, the running control is performed in a manner such that the deviation between the set reference azimuth and the detected progressing azimuth of the robot is set to zero for the interval from the running start point 100 to the first turning point 500. A running distance L of the robot is detected by a running distance sensor. The running distance from the running start point 100 to the first turning point 500 is given by width $L_x$ — (whole length of robot)

Therefore when the detected distance L is equal to $L$ = (width $L_x$ — whole length of robot)

the arrival to the turning point 500 is determined. The robot is turned to the first preset turning direction, that is, to the left by 90° and the depth running is performed so as to obtain the lap width W. When the running distance L after the robot was turned to the left at the turning point 500 coincides with the lap width W, the arrival to a turning point 600 is known and the robot is turned to the left by 90°. In a manner similar to the above, the running in the width direction and depth direction is repeated. When the first turning point 500 is set to the left, as shown in FIG. 3, the turning direction is repetitively set as follows.

left - left - right - right - left - left - ...

On the other hand, if the first turning point 500 is set to the right, as shown in FIG. 4, the turning direction is repetitively set as follows.

right - right - left - left - right - right - ...

With respect to the automatic operation according to the above zigzag running pattern 14, in the control apparatus of the invention, by executing the manual operation with regard to the initial stage of the running pattern 14 in a state in which the teaching mode is set, the operating mode can be shifted to the automatic operation without needing the setting operations of the width and first turning direction.

That is, the robot is positioned to the running start point 100 in the working range 12 and the progressing direction is set to the direction such as to obtain the first straight running pattern 14-1 in a manner similar to the case at the start of the automatic operation. In this state, the teaching mode is set and the manual operation is performed. The running of the robot along the straight running pattern 14-1 is performed by the manual operation from the running start point 100 and the robot is manually turned to the left by 90° at the first turning point 500. Thus, the running distance L obtained by the first straight running and the turning direction, that is, the left direction at the first turning point 500 are automatically set as initial values of the zigzag running pattern 14. Therefore, after the left turning operation at the first turning point 500 was finished, the operating mode is shifted to the automatic operation according to the running pattern 14.

Figure 5:
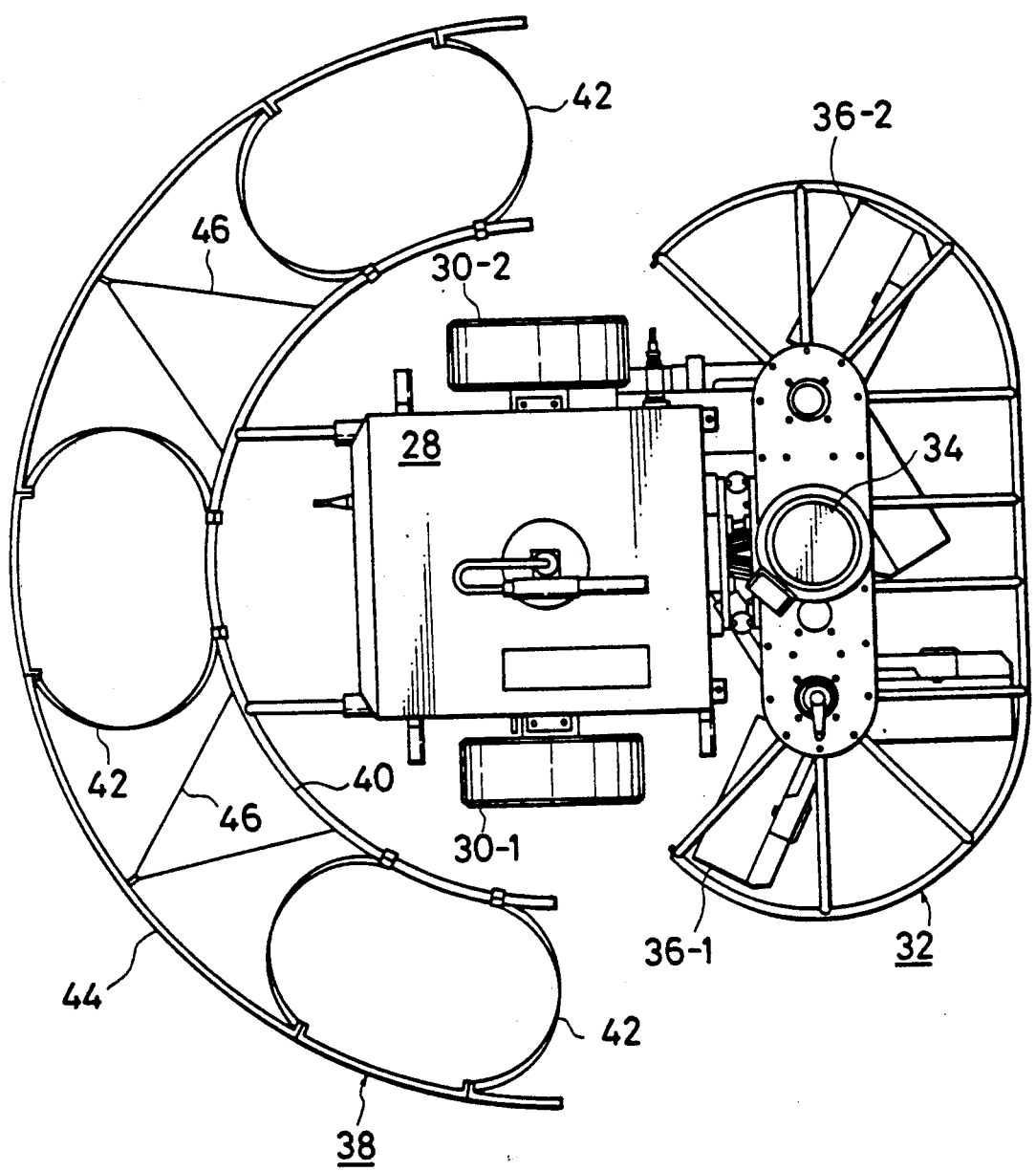
FIG. 5 is a plan view of a working robot of the invention.
Figure 6:
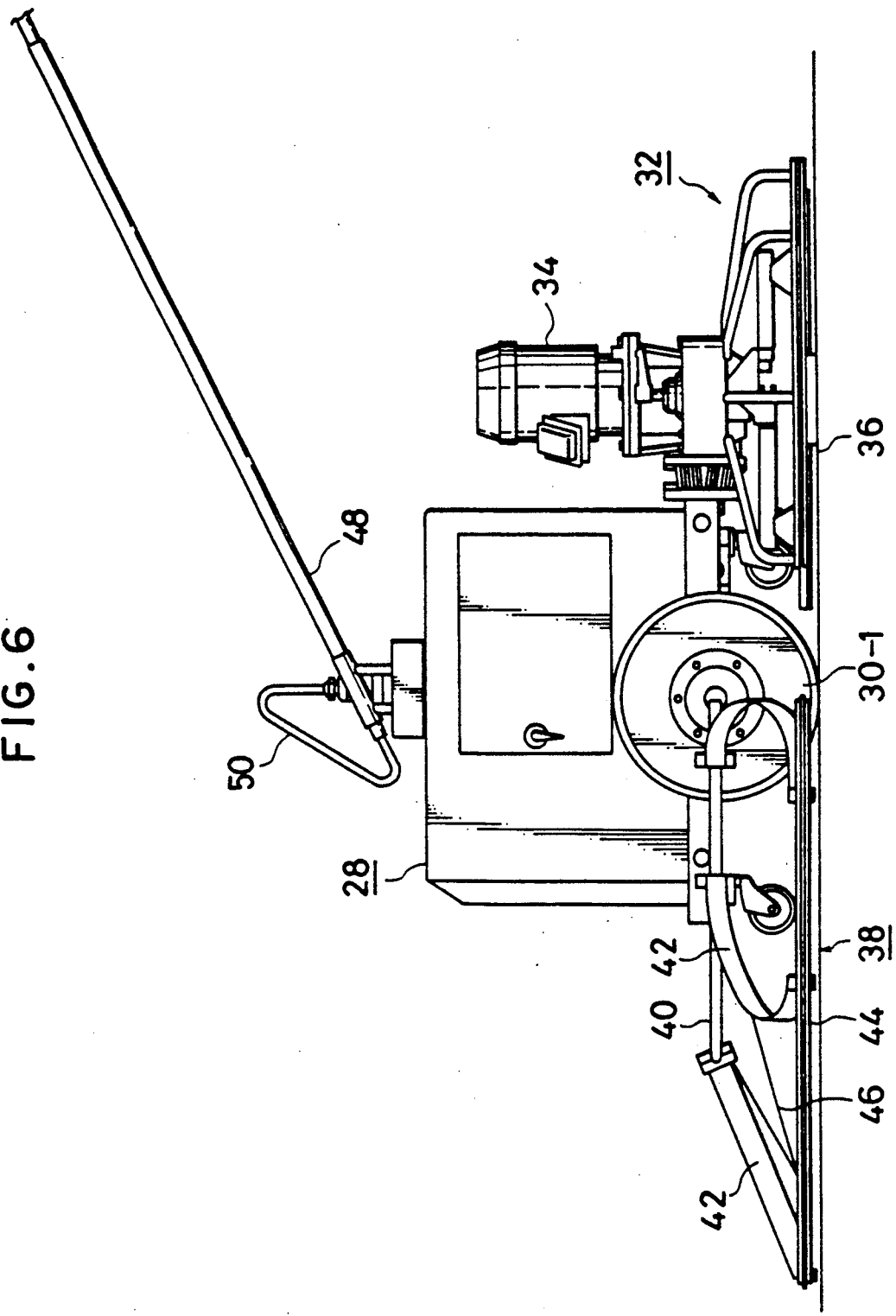
FIG. 6 is a side elevational view of the working robot of the invention.

FIG. 5 is a plan view showing an embodiment of a working robot to finish a concreted floor to which the control apparatus of the invention is applied. FIG. 6 shows a side elevational view.

In FIGS. 5 and 6, running wheels 30-1 and 30-2 are attached to the left and right sides of a robot main body 28. The running wheels 30-1 and 30-2 are driven by independent motors. A trowel section 32 is coupled to the rear portion of the robot main body 28. A pair of rotary trowels 36-1 and 36-2 attached to the left and right sides of the robot main body are rotated at a predetermined speed by a trowel motor 34, thereby flattening the concrete.

A bumper section 38 is provided in the front portion of the robot main body 28. In the bumper section 38, a bumper 44 is supported through a leaf spring 42 to a frame 40 on the side of the robot main body 28. An interval between the frame 40 and the bumper 44 is determined by a wire 46. An obstacle sensor, for instance, a touch sensor which operates by a collision to an obstacle such as a pillar or the like is provided in the bumper 44.

Further, as will be obvious from FIG. 6, a power source cable 50 which is supported by a pole 48 is connected to the upper portion of the robot main body 28 from the outside of the working range.

Figure 7:
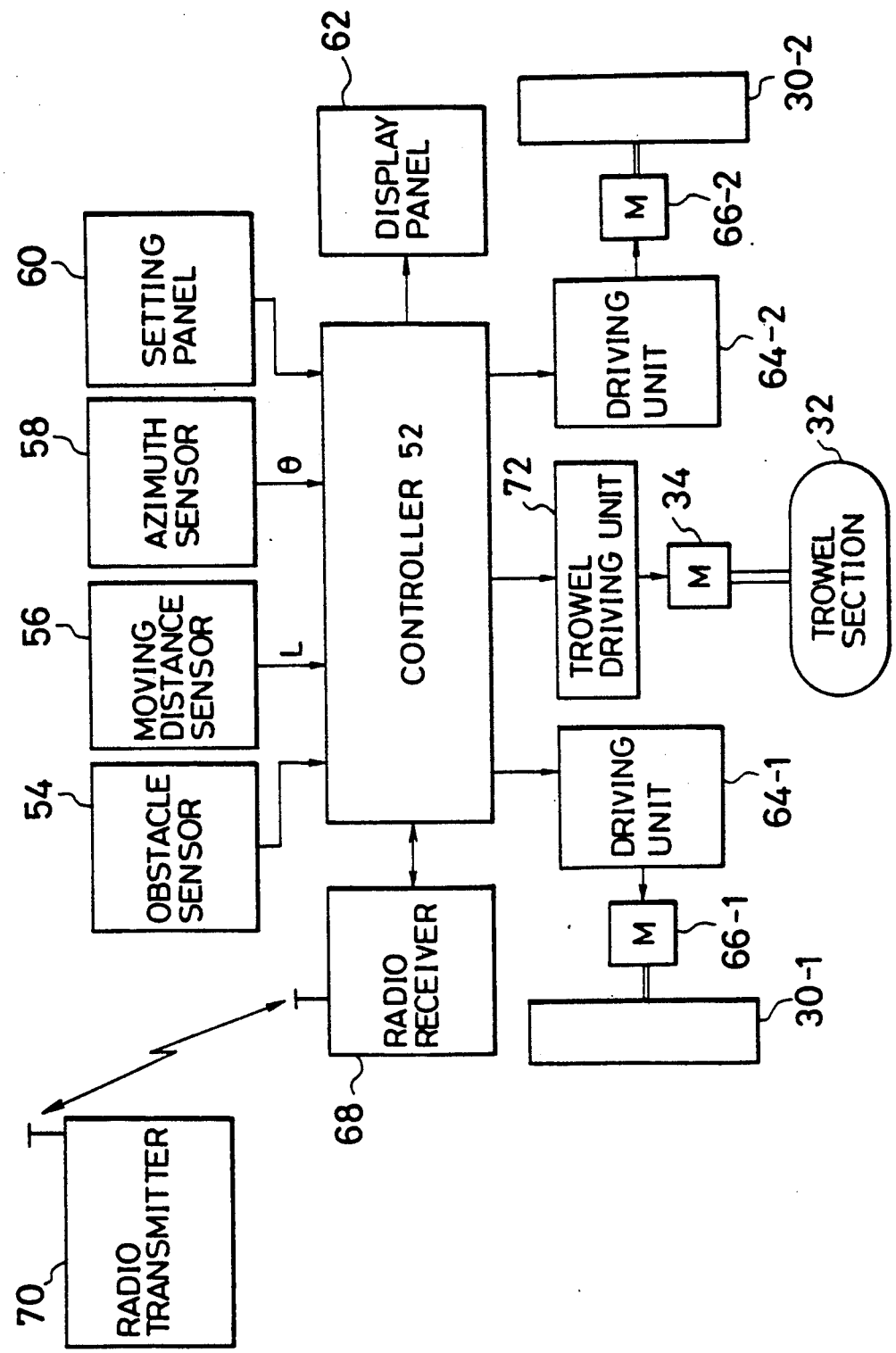
FIG. 7 is a constructional view of an embodiment of a control apparatus of the invention.

FIG. 7 is a block diagram showing a construction of the control apparatus of the invention.

In FIG. 7, a controller 52 using a CPU is provided for the robot main body and executes various controls such as manual operation, automatic operation, automatic operation according to the teaching mode, and the like. Detection outputs of an obstacle sensor 54, a moving distance sensor 56, and an azimuth sensor 58 are given to the controller 52. The obstacle sensor 54 is provided in the bumper 44 shown in FIGS. 5 and 6. When the bumper 44 collides with an obstacle such as a pillar or the like, a sensor output is supplied to a controller 52 and the running operation is stopped. The moving distance sensor 56 detects the running distance L of the robot. The azimuth sensor 58 uses, for instance, a gyrocompass and detects a progressing azimuth $\theta$ of the robot in which the autorotation axis of the earth is used as a reference.

On the other hand, a setting panel 60 is provided for the controller 52. The setting panel 60 has setting switches as shown in, for example, FIG. 8.

Figure 8:
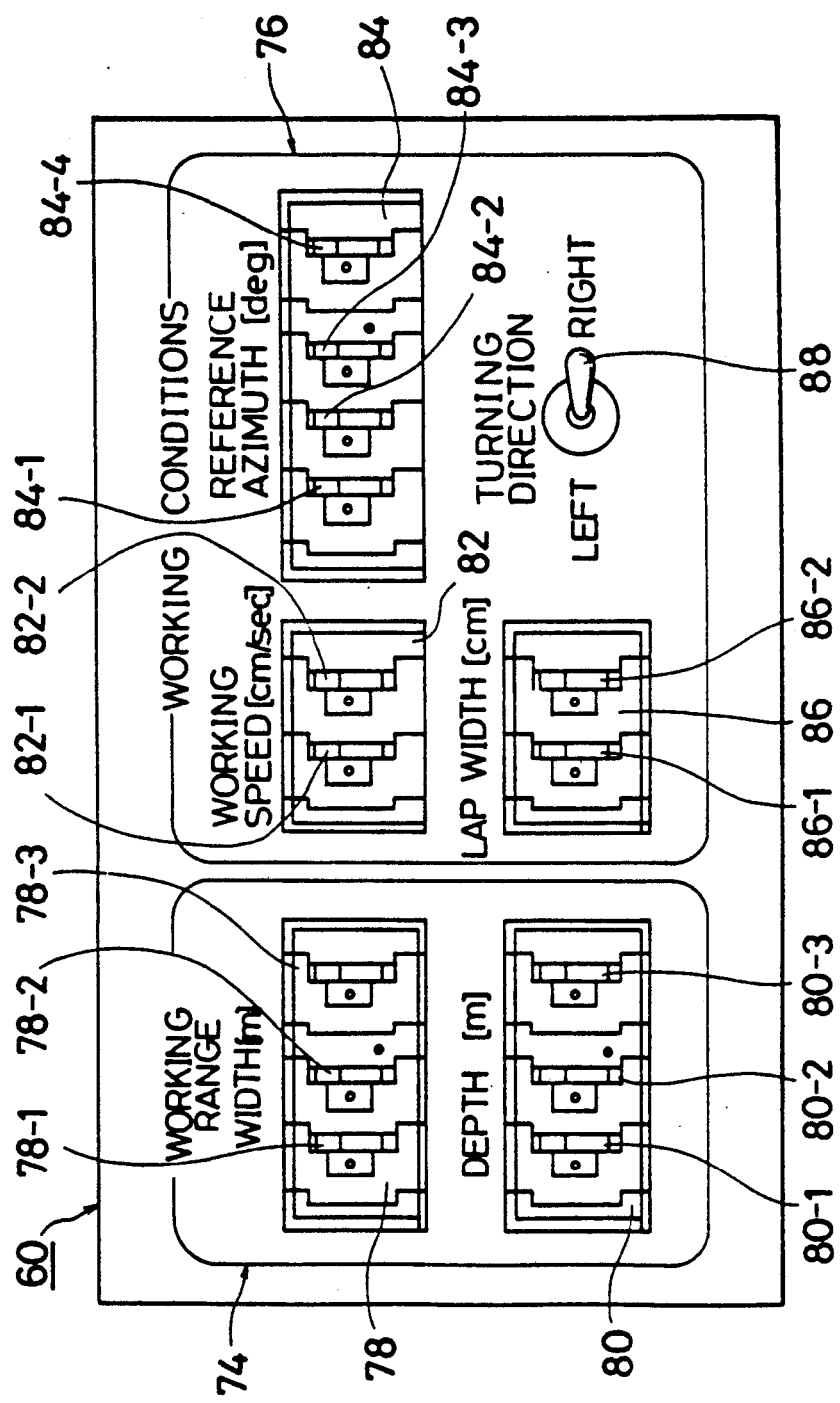
FIG. 8 is an explanatory diagram of a set panel provided for the working robot of the invention.

In FIG. 8, a working range setting section 74 and a working condition setting section 76 are provided for the setting panel 60.

A width setting switch 78 and a depth setting switch 80 are provided for the working range setting section 74. The setting switches 78 and 80 are constructed by digital switches 78-1 to 78-3 and 80-1 to 80-3 of the dial type of three digits including the value down to the first decimal place and can set the width and depth by a range from 0 to 99.9 m. FIG. 8 shows a setting state of all zero.

The working condition setting section 76 has a working speed setting switch 82, a reference azimuth setting switch 84, a lap width setting switch 86, and a turning direction setting switch 88. The working speed setting switch 82 has digital switches 82-1 and 82-2 of two digits and can set a working speed by a range from 0 to 99 cm/sec. The reference azimuth setting switch 84 has digital switches 84-1 to 84-4 of four digits for reading the progressing azimuth detected by the azimuth sensor 58 when the robot was set to the working direction at the running start point 100 and setting by a range from 0° to 360.0°. The lap width setting switch 86 has digital switches 86-1 to 86-2 of two digits and can set the lap width W by a range from 0 to 99 cm. Further, the turning direction setting switch 88 sets either the left or the right as a first turning direction in the running pattern.

Referring again to FIG. 7, a display panel 62 is provided for the controller 52. The progressing azimuth $\theta$ of the robot detected by the azimuth sensor 58 is displayed by the display panel 62 in a real-time manner. On the other hand, the manual or automatic operating state, the teaching mode setting state, and the operating mode such as an operating state of the gyrocompass as an azimuth sensor 58 or the like are displayed on the display panel 62. Therefore, by reading the detected azimuth by the azimuth sensor 58 which is displayed by the display panel 62, the reference azimuth when the robot was directed to the progressing direction at the running start point is read, and the reference azimuth can be set by the reference azimuth setting switch 84 shown in FIG. 8.

On the other hand, driving units 64-1 and 64-2 to control motors 66-1 and 66-2 of the left and right running wheels 30-1 and 30-2 are provided as objects to be driven by the controller 52. The straight movement and turning operation of the robot are executed by controlling the driving units 64-1 and 64-2 by the controller 52. On the other hand, a trowel driving unit 72 is provided. The trowel motor 34 is driven by the trowel driving unit 72 and rotates the rotary trowel provided in the trowel section 32 at a predetermined speed. The driving of the trowel motor 34 by the trowel driving unit 72 is executed prior to starting the manual operation or automatic operation and is stopped after completion of the operation.

Further, to remote-operate the robot from the outside of the working range, a radio transmitter 70 which the operator carries as a handset is provided. A radio receiver 68 is provided to receive an operation signal from the radio transmitter 70 and give to the controller 52.

Figure 9:
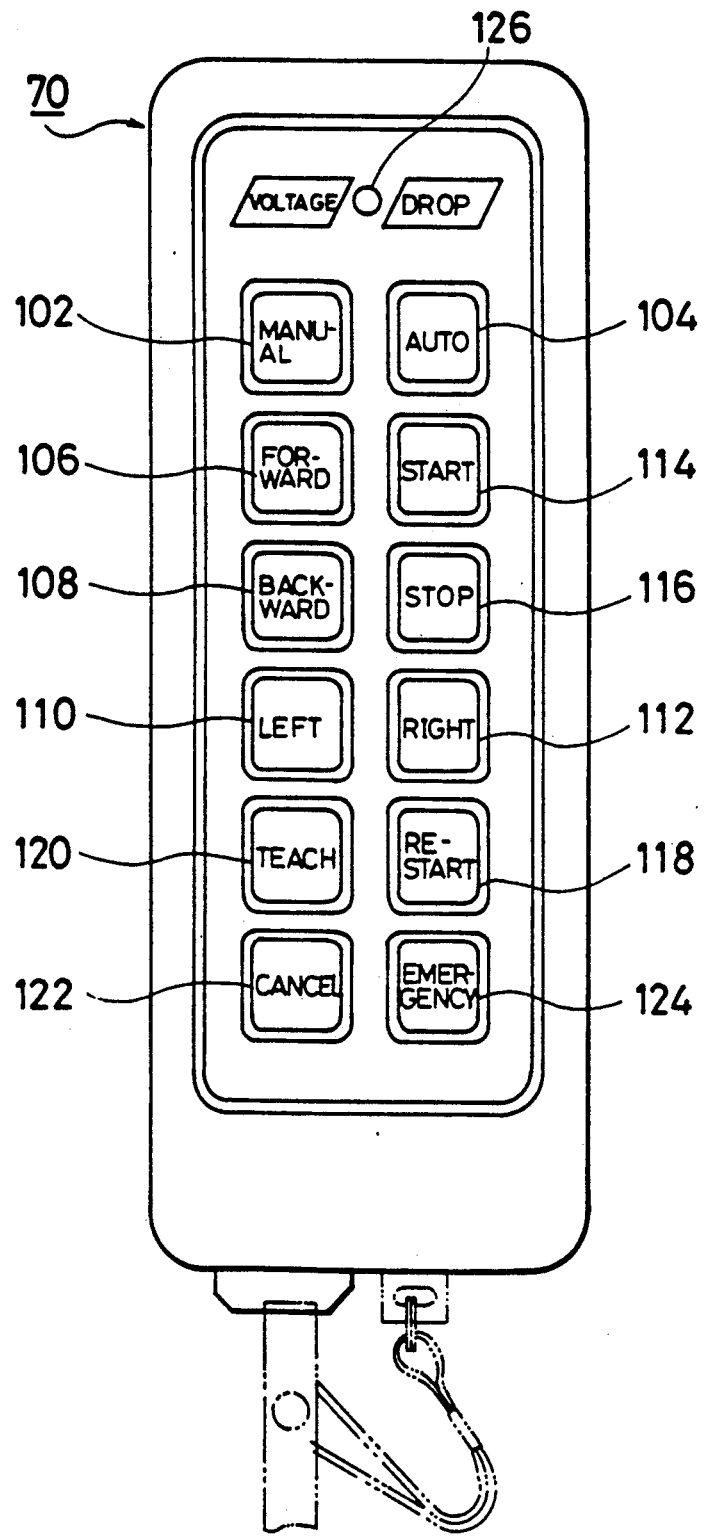
FIG. 9 is an explanatory diagram of a radio transmitter for remote control which is used to operate the robot of the invention.

FIG. 9 is an explanatory diagram of the radio transmitter 70 shown in FIG. 7 which the operator carries as a handset.

In FIG. 9, the radio transmitter 70 has twelve switches 102 to 124. That is, the manual operating mode is selected by the manual switch 102. The automatic operating mode is selected by the automatic switch 104. By operating the forward switch 106, backward switch 108, left turn switch 110, and right turn switch 112 in a state in which the manual operating mode was selected by the manual switch 102, the manual operation can be performed. The operation of each of the switches 106, 108, 110, and 112 is effective for the interval when the switch is depressed.

On the other hand, when the automatic operating mode is selected by the automatic switch 104, the automatic operation is started by the operation of the start switch 114. By operating the stop switch 116, the automatic operation is temporarily stopped. When the restart switch 118 is depressed in the interruption state of the automatic operation, the automatic operation is restarted.

The teaching mode can be set by operating the teaching switch 120 in a state in which the automatic operation was selected by the automatic switch 104. When the teaching mode is set by the teaching switch 120, the manual operation by the switches 106, 108, 110, and 112 can be executed.

When the cancel switch 122 is operated in a state in which the operation was stopped by the detection output of the obstacle sensor 54 provided in the bumper, the detection output of the obstacle sensor 54 is canceled and the manual operation can be performed. Further, the emergency switch 124 is used for emergency stop. By depressing the emergency switch 124 during the automatic operation or manual operation, the robot can be emergency stopped. Reference numeral 126 denotes an indicator lamp to indicate a voltage drop of a battery provided in the robot.

The control operation according to the invention will now be described with reference to a flowchart of FIG. 10.

Figure 10:
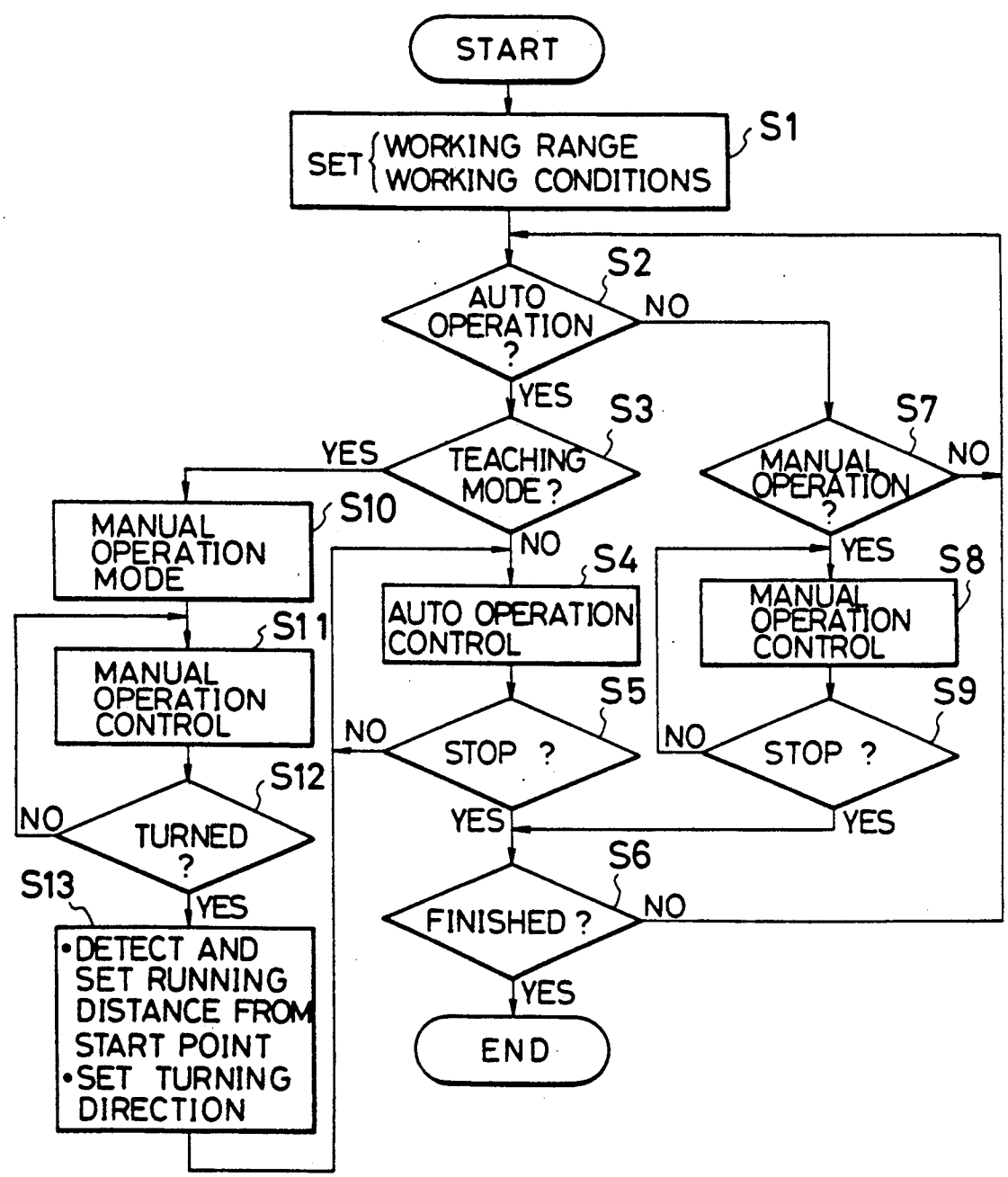
FIG. 10 is a flowchart showing the operation control of the invention.

In FIG. 10, the working range and working conditions are first set in step S1. In setting of the working conditions and working range in step S1, e.g., the robot is moved and positioned to the running start point 100 in the working range 12 shown in FIG. 2 by the manual operation. The progressing direction of the robot is set into the direction of the first straight running pattern 14-1 in the running pattern 14.

First, with respect to the working range, the value of width $L_x$ is set by using the width setting switch 78 provided in the working range setting section 74 of the setting panel 60 in FIG. 8. On the other hand, the value of depth $L_y$ is set by using the depth setting switch 80. Next, a proper running speed is set by the working speed setting switch 82 provided in the working condition setting section 76. The value of the detection azimuth $\theta$ by the azimuth sensor 58 which is displayed on the display panel 62 of the robot main body is set as a reference azimuth by using the reference azimuth setting switch 84. In addition, a desired lap width W is set by using the lap width setting switch 86. Further, for instance, the left direction is set as a turning direction at the first turning point 500 by using the turning direction setting switch 88.

After completion of the above setting operations, the automatic operation is started by operating the automatic switch 104 and start switch 114 of the radio transmitter 70 shown in FIG. 9. Thus, the automatic operation is discriminated in step S2. Further, in step S3, a check is made to see if the teaching mode has been set or not. At this time, if the teaching mode is not selected, step S4 follows and the automatic operation control is executed. In the automatic operation control in step S4, the operation is controlled such that the difference between the set reference azimuth and the progressing azimuth which was actually detected is kept to zero. On the other hand, to discriminate the arrival at the turning point, the set width $L_x$ is compared with the running distance L with respect to the running mode in the width direction. The lap width W is compared with the running distance L with regard to the running mode in the depth direction. When the running distance L coincides with the set width $L_x$ or lap width W, the arrival at the turning point is determined. If the arrival at the turning point has been decided, the turning operation of 90° according to the repetitive pattern of the turning direction which is determined by the turning direction of the first turning point 500 is performed.

In the process of the automatic operation control in step S4, the automatic operation is continued while checking whether the automatic operation control is stopped or not in step S5. When the stop switch 116 is operated or the detection output of the obstacle sensor 54 is obtained, step S6 follows. If the robot doesn't reach the end point 200 of the running pattern, the processing routine is returned to step S2.

On the other hand, if the automatic operation is not set in step S2, step S7 follows and a check is made to see if the manual operation has been set or not. If YES, the manual operation control is executed in step S8. In the manual operation control, the progressing azimuth by the azimuth sensor 58 at the start of the manual operation is set as a reference azimuth. The running control is performed so as to keep the difference between the reference azimuth and the detected azimuth to zero for the interval when the forward switch 106 or backward switch 108 is continuously depressed. When the right turn switch 110 or left turn switch 112 is operated, the turning operation to the left or right is executed for the interval when each switch is continuously depressed. In step S9, a check is made to see if the manual operation is stopped or not during the manual operation control in step S8. When the manual operation control is stopped or the detection output of the obstacle sensor 54 is obtained, the manual operation control is canceled and step S6 follows.

If none of the manual operation and the automatic operation is set, the apparatus is set into the standby mode in which the processes in steps S2 and S7 are repeated.

The operation in the case where the teaching mode was set simultaneously with the automatic operation will now be described. As a setting operation in step S1 when the teaching mode is set, it is sufficient to initialize only the depth $L_y$ in the working range and the working speed V and lap width W as working conditions. There is no need to particularly set any value other than them.

First, in step S2, the automatic operation is discriminated and step S3 follows. In step S3, a check is made to see if the teaching mode has been set by the teaching switch 120 provided for the radio transmitter 70 in FIG. 9 or not. Then, step S10 follows.

In step S10, the manual operating mode is set and, thereafter, the manual operation enable state is set. Subsequently, in step S11, the operator starts the manual operation control of the robot which has been positioned toward the direction of the first straight running pattern 14-1 at the running start point 100 in FIG. 2. Practically speaking, it is sufficient to continuously depress the forward switch 106 provided for the radio transmitter 70 shown in FIG. 9. When the forward switch 106 is depressed, in a manner similar to the manual operation control in step S8, the progressing azimuth detected by the azimuth sensor 58 upon switching operation is set as a reference azimuth. After that, the operation is controlled so as to keep the difference between the detection azimuth and the reference azimuth to zero.

If the manual straight running was started, the operator discriminates that the robot has arrived at the first turning point 500 and depresses the left turn switch 110, thereby turning the robot to the left by 90°.

The turning operation is monitored in step S12. After completion of the turning operation, step S13 follows and the running distance L which was detected by the straight running from the running start point 100 to the first turning point 500 is set as a running distance $L_x$ in the width direction of the zigzag running pattern 14. At the same time, the turning direction, that is, the left direction at the turning point 500 is set.

By setting the first straight running distance and first turning direction in step S13, the same setting state as the case where the width $L_x$ of the working range and the turning direction $\theta$ were set by the setting panel 60 shown in FIG. 8 is obtained.

After that, the processing routine advances from step S13 to step S4 for the automatic operation control. In a manner similar to the above case where the automatic operating mode was selected, the automatic operation along the zigzag running pattern 14 is started.

The above embodiment has been described with respect to the case where only the first straight running and the first turning operation are manually operated in the teaching mode and the initial values of the running pattern are automatically set. However, after completion of the first turning operation, if the operation until the next turning operation (turning point 600 in FIG. 2) is manually operated, the lap width W can be also automatically set. On the other hand, the manual operation can be also executed along the path of the running start point 100→ first turning point 500→ end point 200 and the running distance at that time can be also automatically set as an initial value by teaching the width $L_x$ and depth $L_y$ to determine the working range.

Figure 1:
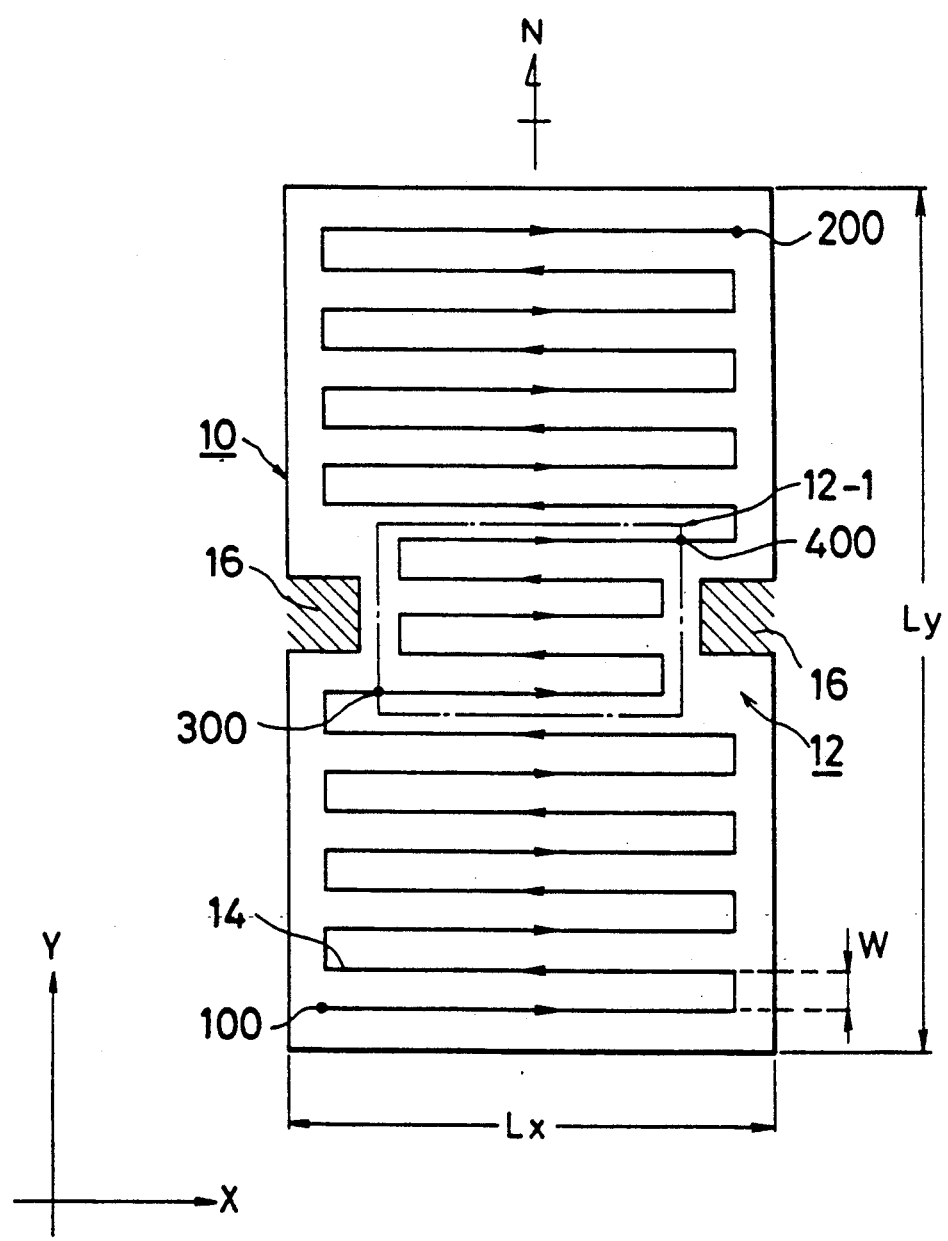
FIG. 1 is an explanatory diagram of a zigzag running pattern.

Further, the automatic operation in the teaching mode in FIG. 10 has been described with respect to the case where the operation of the robot was started from the running start point 100. However, during the automatic operation, for instance, as shown in FIG. 1, if the automatic operation is once stopped when the robot approaches the position where the width changes due to the existence of the obstacle 16 such as a pillar or the like, the operating mode is switched to the teaching mode, the first straight running subsequent to the operation start point is executed by the manual operation, and the turning operation is completed, the running pattern is automatically changed and set to the running pattern adapted to the new working range in which the width was changed. The operating mode can be shifted to the new automatic operation.

In FIG. 10, the teaching mode has been selected after the automatic operation was selected. However, it is also possible to construct in a manner such that the processes in steps S10 to S13 are executed by setting the teaching mode irrespective of the presence or absence of the selection of the automatic operation and the processing routine advances to the automatic operation control in step S4.

As mentioned above, according to the present invention, even if the working start point changes due to the order of the concreting processes, by executing the manual operation in the teaching mode with respect to the first straight running and the first turning operation from the working start point, the automatic operation by the zigzag running pattern adapted to the working range can be automatically executed. Thus, each time the working range changes, there is no need to measure the width. The necessary information can be automatically set by the teaching mode.

Further, as a straight running distance and a turning direction to obtain the zigzag running pattern, the results of the detections of the moving distance sensor and the azimuth sensor which are provided for the robot are used and the running pattern is decided by the robot itself. Therefore, even if the accuracies of the distance sensor or azimuth sensor change depending on the aging change or the state of the concrete, the measuring system and the detecting system which is used for the actual operation control are the same. Thus, the automatic operation along the running pattern can be executed without being influenced by the changes in accuracies of the moving distance sensor and azimuth sensor.

What is claimed is:

1. A control apparatus of a working robot to flatten and finish a concreted floor by a rotary trowel while running on the concreted floor, comprising:
   running distance detecting means for detecting a running distance of the working robot;
   azimuth detecting means for detecting a progressing azimuth of the working robot;
   working range setting means for setting a working range of the working robot;
   running pattern setting means for setting a zigzag running pattern in the working range by setting the progressing direction, a first turning direction, and a lap width as initial values in a state in which the working robot was positioned to a running start point in the working range;
   mode selecting means for selecting either one of an automatic operating mode, a manual operating mode, and a teaching mode;
   automatic operation control means for running the working robot so as to trace the zigzag running pattern which was set by said running pattern setting means when the automatic operating mode was selected by the mode selecting means;
   manual operation control means for running the working robot in accordance with a forward, backward, or turning operation by an operator when the manual operating mode was selected by the mode selecting means; and
   teaching operation control means which is constructed in a manner such that when the teaching mode was selected by the mode selecting means, the manual operating mode is first automatically selected, and when a first straight running according to the zigzag running pattern to be set and the turning operation subsequent to the straight running were executed by the manual operation control, the straight running distance detected by the running distance detecting means and the turning direction obtained from a change in progressing azimuth detected by the azimuth detecting means are input as initial values to the running pattern setting means, thereby setting the zigzag running pattern, and after the zigzag running pattern was set, the automatic operating mode is automatically selected, and the automatic operation by the automatic operation control means is started.

2. A control apparatus according to claim 1, wherein said working range setting means comprises: a width setting switch to set a width of working range and a depth setting switch to set a depth of working range.

3. A control apparatus according to claim 1, wherein said running pattern setting means comprises:
   reference azimuth setting switch for setting a detection azimuth which is detected by the azimuth detecting means as a reference azimuth indicative of a progressing direction when the working robot is positioned to a running start point and is set into a prescribed progressing direction;
   turning direction setting switch to switch and select the first turning direction; and
   a lap width setting switch to set a lap width in a depth direction in the zigzag running pattern.

4. A control apparatus according to claim 1, wherein said running pattern setting means sets a repetition of a turning pattern of left, left, right, and right in the case where the initial turning direction was set to the left direction and sets a repetitive of a turning pattern of right, right, left, and left in the case where the initial turning direction was set to the right direction.

5. A control apparatus according to claim 1, wherein said automatic operation control means compares the detection distance of the running distance detecting means during the running from the running start point or turning point to the next turning point with a reference distance based on the zigzag running pattern, and when the detection distance coincides with the reference distance, the automatic operation control means decides that the robot has arrived at the next turning point and executes the turning operation by 90°.

6. A control apparatus according to claim 1, wherein said manual operation control means executes each of the operations for the interval when a forward switch, a backward switch, and a turning switch are being operated.

7. A control apparatus according to claim 1, wherein said manual operation control means sets the detection azimuth by the azimuth detecting means at the start of the operation as a reference azimuth when the forward operation or backward operation is being executed and feedback controls so as to coincide the subsequent detection azimuth of the azimuth detecting means with the reference azimuth, thereby allowing the straight running to be performed.

* * * * *